United States Patent
Venkatasubramanian et al.

(10) Patent No.: US 12,169,730 B2
(45) Date of Patent: Dec. 17, 2024

(54) HANDLING MEMORY ACCOUNTING WHEN SUSPENDING AND RESUMING VIRTUAL MACHINES TO/FROM VOLATILE MEMORY

(71) Applicant: VMware LLC, Palo Alto, CA (US)

(72) Inventors: Rajesh Venkatasubramanian, San Jose, CA (US); Ishan Banerjee, Santa Clara, CA (US); Preeti Agarwal, San Jose, CA (US); Ashish Kaila, San Jose, CA (US); Halesh Sadashiv, Bangalore (IN)

(73) Assignee: VMware LLC, Palo Alto, CA (US)

( * ) Notice: Subject to any disclaimer, the term of this patent is extended or adjusted under 35 U.S.C. 154(b) by 600 days.

(21) Appl. No.: 17/530,522

(22) Filed: Nov. 19, 2021

(65) Prior Publication Data

US 2023/0027937 A1    Jan. 26, 2023

(30) Foreign Application Priority Data

Jul. 24, 2021 (IN) .............................. 202141033344

(51) Int. Cl.
    *G06F 9/455* (2018.01)
(52) U.S. Cl.
    CPC ................... *G06F 9/45558* (2013.01); *G06F 2009/45575* (2013.01)
(58) Field of Classification Search
    CPC ........................................... G06F 9/45558–46
    See application file for complete search history.

(56) References Cited

U.S. PATENT DOCUMENTS

| | | | |
|---|---|---|---|
| 11,829,792 B1* | 11/2023 | Chandrashekar ... | G06F 9/45558 |
| 2011/0023030 A1* | 1/2011 | Lim ...................... | G06F 9/5077 718/1 |
| 2012/0254865 A1* | 10/2012 | Saeki ...................... | G06F 8/656 718/1 |
| 2014/0101657 A1* | 4/2014 | Bacher ................ | G06F 9/45558 718/1 |
| 2015/0242232 A1* | 8/2015 | Simoncelli .......... | G06F 9/45558 718/1 |
| 2016/0306649 A1* | 10/2016 | Gunti .................... | G06F 9/4406 |
| 2017/0371691 A1* | 12/2017 | Gunti .................... | G06F 12/109 |

(Continued)

OTHER PUBLICATIONS

HyperFresh: Live Refresh of Hypervisors Using Nested Virtualization Hardik Bagdi, Rohith Kugve, Kartik Gopalan (Year: 2017).*

(Continued)

*Primary Examiner* — Emerson C Puente
*Assistant Examiner* — Paul V Mills
(74) *Attorney, Agent, or Firm* — Quarles & Brady LLP (57) ABSTRACT

Techniques that enable a hypervisor to (1) maintain shared memory pages and (2) handle memory accounting for VMs that are suspended to and resumed from the volatile memory of a host system are provided. Regarding (1), the hypervisor can maintain shared memory pages in volatile memory across the suspend-to-memory and resume-from-memory operations, without having to save their reference counts. Regarding (2), the hypervisor can keep track of the volatile memory reserved and consumed by VMs as they are suspended and resumed, without erroneously double counting that memory.

21 Claims, 7 Drawing Sheets

(56) References Cited

U.S. PATENT DOCUMENTS

| | | | | |
|---|---|---|---|---|
| 2018/0203715 A1* | 7/2018 | Granado | ................ | G06F 8/656 |
| 2019/0171390 A1* | 6/2019 | Freche | ................ | G06F 3/0659 |
| 2020/0174814 A1* | 6/2020 | Saxena | ................ | G06F 9/5077 |
| 2021/0225096 A1* | 7/2021 | Dong | ................ | G06F 9/45558 |
| 2021/0318900 A1* | 10/2021 | Gopalan | ............ | G06F 9/45558 |
| 2023/0009596 A1* | 1/2023 | Zhang | ................ | G06F 9/45558 |

OTHER PUBLICATIONS

Hy-FiX: Fast In-Place Upgrades of KVM Hypervisors Andrea Segalini, Dino Lopez Pacheco, Guillaume Urvoy-Keller, Fabien Hermenier, and Quentin Jacquemart (Year: 2021).*

Fast Software Rejuvenation of Virtual Machine Monitors Kenichi Kourai and Shigeru Chiba (Year: 2011).*

Hierarchical memory resource groups in the ESX Server Ishan Banerjee, Jui-Hao Chiang, Kiran Tati (Year: 2013).*

Fast and Live Hypervisor Replacement Spoorti Doddamani, Piush Sinha, Hui Lu, Tsu-Hsiang K. Cheng, Hardik H. Bagdi, Kartik Gopalan (Year: 2019).*

Zero-copy Migration for Lightweight Software Rejuvenation of Virtualized Systems Kenichi Kourai, Hiroki Ooba (Year: 2015).*

Demand Based Hierarchical QoS Using Storage Resource Pools Ajay Gulati, Ganesha Shanmuganathan, Xuechen Zhang, Peter Varman (Year: 2012).*

VMware Infrastructure: Resource Management with VMware DRS VMware Inc. Revision 20061122; Version: 1.1; Item: VI-ENG-Q206-238 (Year: 2006).*

* cited by examiner

HANDLING MEMORY ACCOUNTING WHEN SUSPENDING AND RESUMING VIRTUAL MACHINES TO/FROM VOLATILE MEMORY

CROSS-REFERENCES TO RELATED APPLICATIONS

Benefit is claimed under 35 U.S.C. 119(a)-(d) to Foreign Application Serial No. 202141033344 filed in India entitled "Handling Memory Accounting When Suspending and Resuming Virtual Machines To/From Volatile Memory", on Jul. 24, 2021, by VMware, Inc., which is herein incorporated in its entirety by reference for all purposes.

The present application is related to commonly owned U.S. patent application Ser. No. 17/530,500, filed concurrently herewith and entitled "Maintaining Shared Memory Pages When Suspending and Resuming Virtual Machines To/From Volatile Memory." The entire contents of this application are incorporated herein by reference for all purposes.

BACKGROUND

Unless otherwise indicated, the subject matter described in this section is not prior art to the claims of the present application and is not admitted as being prior art by inclusion in this section.

In production computing environments, restarting the hypervisor kernel of a host system typically involves evacuating the virtual machines (VM) running on the host system for business continuity purposes and rebooting the host system at the hardware level. The most common evacuation options are suspending the VMs to disk or live migrating the VMs to another host system.

In recent years, some hypervisors have implemented a "quick boot" feature that allows the hypervisor to be restarted without a full hardware reboot (and thus, without losing the contents of the host system's volatile memory). This enables VMs to be suspended to and resumed from volatile memory, rather than being suspended to and resumed from disk or live migrated. An implementation of this quick boot feature and the suspend-to-memory/resume-from-memory operations are disclosed in commonly owned U.S. Pat. No. 10,387,186 entitled "Hypervisor with Virtual-Memory File System," which is incorporated herein by reference for all purposes.

Two challenges that can arise out of suspending and resuming VMs to/from volatile memory pertain to shared (also known as copy-on-write (COW)) memory pages and memory accounting. Regarding the former, because each shared host physical memory page (i.e., machine page number (MPN)) is associated with a reference count that indicates the number of guest physical memory pages (i.e., physical page numbers (PPNs)) pointing to that MPN, there are complexities in maintaining such shared MPNs across the suspend-to-memory and resume-from-memory operations. Regarding the latter, a naïve memory accounting implementation can cause the hypervisor to inadvertently double count the amount of volatile memory used by suspended and resumed VMs, resulting in artificially high memory requirements for completing the overall suspend-to-memory and resume-from-memory process.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Certain embodiments of the present disclosure are directed to techniques that enable a hypervisor to (1) maintain shared MPNs and (2) handle memory accounting for VMs that are suspended to and resumed from the volatile memory of a host system. As used herein, "suspending a VM to volatile memory" refers to saving metadata associated with the VM's PPNs in a protected volatile memory region corresponding to a virtual memory file system ("VMemFS") component of the hypervisor (thereby transferring ownership of those PPNs from the VM to the VMemFS component) and powering off the VM. Conversely, "resuming a VM from volatile memory" refers to powering on the VM and transferring ownership of the VM's PPNs back to the VM using the metadata saved via the suspend-to-memory operation, thereby allowing the VM to continue its execution in accordance with its prior memory state.

With the techniques of the present disclosure pertaining to (1) (i.e., shared memory pages), the hypervisor can maintain shared MPNs in volatile memory across the suspend-to-memory and resume-from-memory operations, without having to save the MPNs' reference counts. This avoids various problems that can occur when saving such reference count information. Further, with the techniques of the present disclosure pertaining to (2) (i.e., memory accounting), the hypervisor can keep track of the volatile memory reserved and consumed by VMs as they are suspended and resumed, without erroneously double counting that memory. The foregoing and other aspects are described in further detail below.

2. Example Computing Environment and Suspend-To-Memory/Resume-From-Memory

Figure 1:
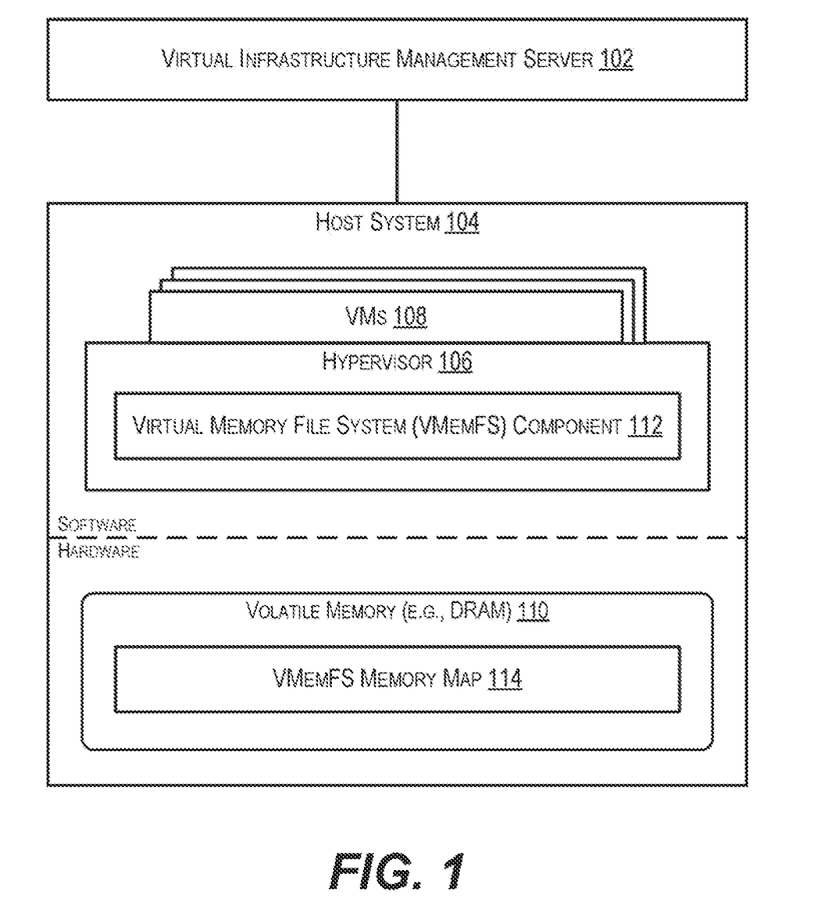
FIG. 1 depicts an example computing environment according to certain embodiments.

FIG. 1 is a simplified block diagram of an example computing environment 100 in which embodiments of the present disclosure may be implemented. As shown, computing environment 100 includes a virtual infrastructure management (VIM) server 102 that is communicatively coupled with a host system 104. Host system 104 includes in software a hypervisor 106 and one or more virtual machines (VMs) 108. Host system 104 also includes in hardware a volatile memory (e.g., dynamic random-access memory (DRAM)) 110 that is configured to hold the in-memory state (e.g., code and data) of hypervisor 106 and VMs 108. In a particular embodiment, computing environment 100 may be a production environment that provides business-critical software services/applications via VMs 108 to end-users.

For purposes of this disclosure, it is assumed that computing environment 100 supports quick booting of hypervisor 106, which allows hypervisor 106 to be restarted without a full hardware reboot of host system 104 and thus enables VMs 108 to be suspended to and resumed from volatile memory 110 across the restart of hypervisor 106. Although an exhaustive description of this quick boot feature is beyond the scope of the present disclosure, generally speaking VIM server 102 can receive (from, e.g., an infrastructure administrator) a request to quick boot hypervisor 106 and send a command to host system 104 indicating that VMs 108 should be suspended to volatile memory 110. In response, a virtual memory file system (VMemFS) component 112 of hypervisor 106 can execute the suspend-to-memory operation by iterating through the PPNs of each VM 108, saving metadata regarding the PPNs (including the MPNs to which the PPNs are mapped) in a VMemFS "memory map" data structure 114 within volatile memory 110, and powering off VMs 108.

Once the suspend-to-memory operation is complete, VIM server 102 can carry out any tasks on hypervisor 106 that prompted the quick boot request, such as patching or upgrading the hypervisor. VIM server 102 can then send a command to host system 104 for restarting hypervisor 106 and resuming its suspended VMs from volatile memory 110. Upon restart of hypervisor 106, VMemFS component 112 can execute the resume-from-memory operation by powering on the suspended VMs, iterating through the PPNs included in memory map 114, and restoring ownership of those PPNs to their respective VMs (by, e.g., populating hypervisor-level page tables with the PPN-to-MPN mappings saved in memory map 114). At the conclusion of this process, the VMs will be restored with the same in-memory state that they had prior to the suspend-to-memory operation and thus can continue with their execution in a transparent manner.

3. Page Sharing and Memory Accounting

As noted in the Background section, two challenges that can arise out of suspending and resuming VMs 108 of FIG. 1 to/from volatile memory 110 pertain to page sharing and memory accounting. Each of these are described in turn below.

3.1 Page Sharing

Page sharing is a hypervisor-level memory management technique that allows multiple PPNs which have the same data content to be mapped to a single MPN (and thus, to a single physical copy of that content). This avoids maintaining multiple redundant copies of data in volatile memory and thus improves host memory efficiency. The single MPN—referred to as a shared page or shared MPN—is marked as read-only and copy-on-write (COW). This means that whenever a VM attempts to write to the shared MPN, a new MPN is allocated for the VM and the write operation is performed on the newly allocated MPN.

Page sharing is typically implemented via a background process that periodically scans through a subset of PPNs of a running VM and compares the data content of each scanned PPN with entries in an in-memory page sharing hash table. Each entry in this hash table corresponds to a shared MPN and includes a hash of the MPN's data content, as well as a reference count indicating the number of PPNs currently sharing (i.e., pointing to) the MPN. If the data content of a scanned PPN p is determined to match a hash table entry corresponding to a shared MPN m, p is updated to point to m in the hypervisor page tables, the previous MPN pointed to by p is freed, and the reference count of m is incremented by one (thereby indicating that p is now sharing it). Conversely, if PPN p or any other PPN sharing MPN m is deleted/freed (which may occur if, e.g., the VM that owns the PPN is powered off), the reference count for m is decremented by one. And if the reference count for any shared MPN in the page sharing hash table reaches zero, that MPN is freed for reuse because there are no longer any sharers pointing to it.

The challenge with page sharing in the context of suspend-to-memory and resume-from-memory is that some mechanism is needed for handling shared MPNs across these operations. According to one approach, VMemFS component 112 of FIG. 1 can simply break the sharing of each shared MPN at the time of suspending VMs 108 to volatile memory 110, which involves allocating a new copy of the MPN to each sharer. This avoids the need to save any state information regarding the shared MPNs, such as their reference counts. However, this approach can significantly increase the memory usage of host system 104 due to the need to allocate new MPNs during the suspend-to-memory operation. If host system 104 does not have sufficient volatile memory, it may not be able to restart hypervisor 106.

According to another approach, VMemFS component 112 can maintain shared MPNs across the suspend-to-memory and resume-from-memory operations and carry over their reference counts via memory map 114. For example, if an MPN m has a reference count of c at the time of the suspend-to-memory operation, VMemFS component 112 can save, in memory map 114, a flag form indicating that it is shared and the value c. Then, upon executing the resume-from-memory operation, VMemFS component 112 can re-populate hypervisor 106's page sharing hash table with an entry for MPN m that includes its saved reference count c.

However, this approach can cause issues in certain edge cases. For instance, assume that five PPNs (corresponding to five different VMs) are sharing MPN m at the time of the suspend-to-memory operation, which causes VMemFS component 112 to save a value of 5 for m in memory map 114. Further assume that, due to an error during the resume-from-memory operation, only four of the VMs are successfully resumed. In this scenario, hypervisor 106's page sharing hash table will be re-populated with an entry for MPN m that includes a reference count of 5, even though only four sharers of m are present at the end of the resume operation. This means that MPN m can no longer be freed by hypervisor 106 because its reference count will always be one greater than the true number of sharers of the page (and thus cannot reach zero).

In addition, because shared MPNs are automatically freed once their reference counts reach zero, it is possible for one or more shared MPNs to be inadvertently freed (and thus, their contents lost) during the suspend or resume operations due to the powering off of the VMs or other circumstances. This is problematic because the contents of each shared MPN should be maintained in volatile memory 110 throughout the duration of these operations so that its sharers can access it once the operations are complete.

3.2 Memory Accounting

Figure 2:
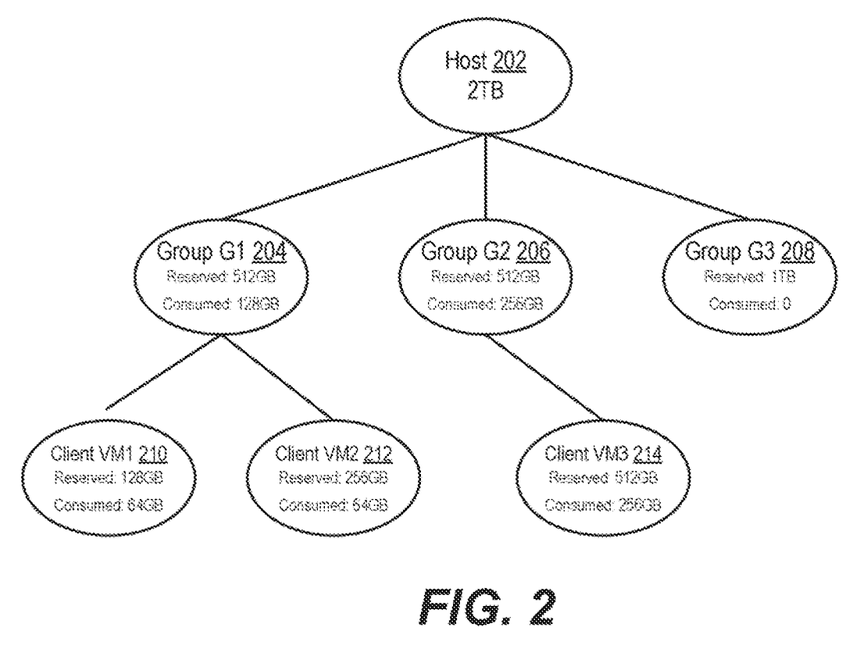
FIG. 2 depicts an example memory resource tree.

Memory accounting refers to the steps performed by a hypervisor for tracking how a host system's volatile memory is partitioned among and used by running processes (e.g., VMs). It is assumed that hypervisor 106 of FIG. 1 implements memory accounting via a data structure known as a memory resource tree. FIG. 2 depicts a simplified example of such a tree (reference numeral 200) according to certain embodiments.

As shown in FIG. 2, memory resource tree 200 includes a root (i.e., host) node 202 that corresponds to host system 104 and represents the entire volatile memory capacity of the host system (e.g., 2 terabytes (TB)). Memory resource tree 200 further includes a number of leaf nodes VM1, VM2, and VM3 (reference numerals 210, 212, and 214), referred to herein as "memory client nodes," that correspond to memory clients (e.g., VMs 108) running on host system 104 and a number of intermediate nodes G1, G2, and G3 (reference numerals 204, 206, and 208), referred to herein as "resource group nodes," that correspond to logical groupings of memory clients in host system 104.

Each memory client node VM1/VM2/VM3 and resource group node G1/G2/G3 includes, among other things, a "reservation" parameter indicating that amount of host volatile memory reserved for that memory client/resource group and a "consumed" parameter indicating the amount of host volatile memory currently consumed by that memory client/resource group. For example, memory client node VM1 has a reservation value of 128 GB and a consumed value of 64 GB, indicating that 128 GB of the host system 104's 2 TB total volatile memory capacity are reserved for use by VM1 and 64 GB are currently consumed by VM1. Generally speaking, a memory scheduler of hypervisor 106 will automatically update these values and add/remove nodes to/from memory resource tree 200 as new VMs are powered on and existing VMs are powered off, thereby tracking memory usage across host system 104.

The challenge with memory accounting in the context of suspend-to-memory and resume-from-memory stems from the need to track the volatile memory used by VMs as they are suspended and resumed by VMemFS component 112. A relatively straightforward way to perform this tracking is to create, in hypervisor 106's memory resource tree, one or more memory client nodes for VMemFS component 112 that include reservation values equal to the total size of the memories for the suspended VMs. This allows hypervisor 106 to account for the fact that those memory amounts are still in use and "owned" by VMemFS component 112 as a result of the suspend operation.

However, a significant problem with this approach is that, when VMemFS component 112 executes the resume-from-memory operation and powers on each suspended VM, hypervisor 106 will attempt to create a new node in its memory resource tree for the VM with a reservation value equal to the VM's memory size. As a result, the memory of each resumed VM will be accounted for twice in the memory resource tree—once via the reservation value(s) of the VMemFS node(s) and again via the reservation value of the new node created for the VM during the resume operation. If host system 104 does not have sufficient free volatile memory to accommodate this double accounting, the suspended VMs cannot be powered on again, thereby causing the overall suspend-to-memory and resume-from-memory process to fail.

4. High-Level Solution Descriptions

Figure 3:
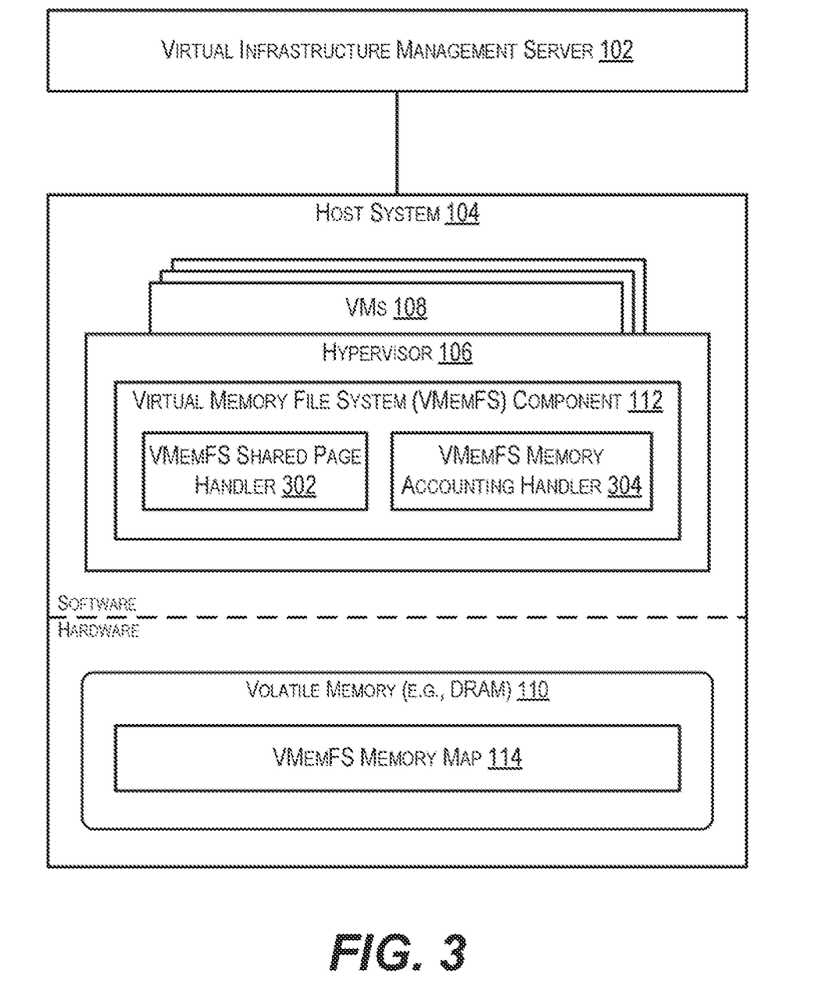
FIG. 3 depicts a version of the computing environment of FIG. 1 that implements the techniques of the present disclosure.

To address the foregoing and other similar issues, FIG. 3 depicts a modified version of computing environment 100 of FIG. 1 that includes two novel components within hypervisor 106 of host system 104: a VMemFS shared page handler 302 and a VMemFS memory accounting handler 304. Although components 302 and 304 as shown as being part of VMemFS component 112, in alternative embodiments these components can reside at any other location within the software stack of hypervisor 106.

As detailed in section (5) below, shared page handler 302 enables VMemFS component 112 to maintain shared MPNs when suspending and resuming VMs 108 to/from volatile memory 110, without having to carry over explicit reference counts for those MPNs via memory map 114. At a high level, this is achieved by (a) saving the shared status of each shared MPN in memory map 114, (b) dynamically decrementing, in hypervisor 106's page sharing hash table, the reference counts of the shared MPNs during the suspend-to-memory operation as VMs are powered off, and (c) dynamically incrementing, in the page sharing hash table, the reference counts of the shared MPNs during the resume-from-memory operation as VMs are powered on. As part of (b) and (c), VMemFS component 112 can add a single reference count to each shared MPN during the suspend and resume operations in order to account for component 112's handling of those shared pages.

With this approach, a number of advantages are realized. First, because the shared MPNs are transferred across the suspend-to-memory and resume-from-memory operations in their shared state, there is no need to break the sharing of these pages at the time of the suspend operation, resulting in low memory overhead. Second, because the reference counts of the shared MPNs are not carried over, the various problems that can arise out saving and restoring such reference counts (such as, e.g., erroneously allowing MPNs with zero remaining sharers to remain in use) are avoided. Third, because VMemFS component 112 adds a single reference count to the shared MPNs as part of the suspend and resume operations to reflect its own processing of those pages, the shared MPNs will not be inadvertently freed during these operations (due to, e.g., their reference counts dropping to zero).

Further, as detailed in section (6) below, memory accounting handler 304 enables VMemFS component 112/hypervisor 106 to accurately account for the volatile memory that is used by VMs 108 as they suspended to and resumed from volatile memory 110. At a high level, this is achieved by (a) creating, in hypervisor 106's memory resource tree, a new intermediate node (i.e., resource group node) for VMemFS component 112 under the root (i.e., host) node that does not reserve any volatile memory (and thus has a zero reservation value); (b) at the time of suspending each VM 108, creating, in the memory resource tree, a new leaf node (i.e., memory client node) under the VM's existing node for VMemFS component 112 and increasing the consumed parameter of this new memory client node as guest memory pages (i.e., PPNs) of the VM are processed by component 112 and added to memory map 114 (thereby recording the ownership change of those PPNs from the VM to component 112); (c) upon powering off each suspended VM 108, moving the new memory client node created at (b) to reside under the VMemFS resource group node created at (a); (d) at the time of resuming each VM 108, moving the VM's memory client node under the VMemFS resource group node to reside under the VM's existing node and decreasing the consumed parameter of this memory client node as ownership of the VM's PPNs are returned to the VM from VMemFS component 112; and (e) upon completion of the suspend-to-memory operation, deleting all of the memory client nodes and the VMemFS resource group node created at (a) and (b).

Because this approach does not reserve any host volatile memory via the VMemFS resource group (which simply holds, for accounting purposes, the VM memory transferred to VMemFS component 112 during the suspend operation), this approach advantageously avoids double counting that memory when the VMs are powered back on during the resume operation and allocated new memory reservations equal to their respective memory sizes.

It should be appreciated that FIGS. 1-3 are illustrative and not intended to limit embodiments of the present disclosure.

For example, although these figures and the foregoing description generally assume that the techniques of the present disclosure are implemented by a hypervisor in the context of suspending and resuming virtual machines (VMs) to/from volatile memory, these techniques may also be implemented by an operating system in the context of suspending and resuming various software processes (e.g., containers, applications, etc.) to/from volatile memory. Accordingly, all references to "hypervisor" in the present disclosure can be interchangeably replaced with "operating system" and all references to "VM" in the present disclosure can be interchangeably replaced with "software process."

Further, although FIGS. 1 and 3 depict a particular arrangement of entities and components within computing environment 100, other arrangements are possible (e.g., the functionality attributed to a particular entity/component may be split into multiple entities/components, entities/components may be combined, etc.) and the various entities/components shown may include sub-components and/or functions that are not specifically described. One of ordinary skill in the art will recognize other variations, modifications, and alternatives.

5. Shared Page Handling Workflows

Figure 4:
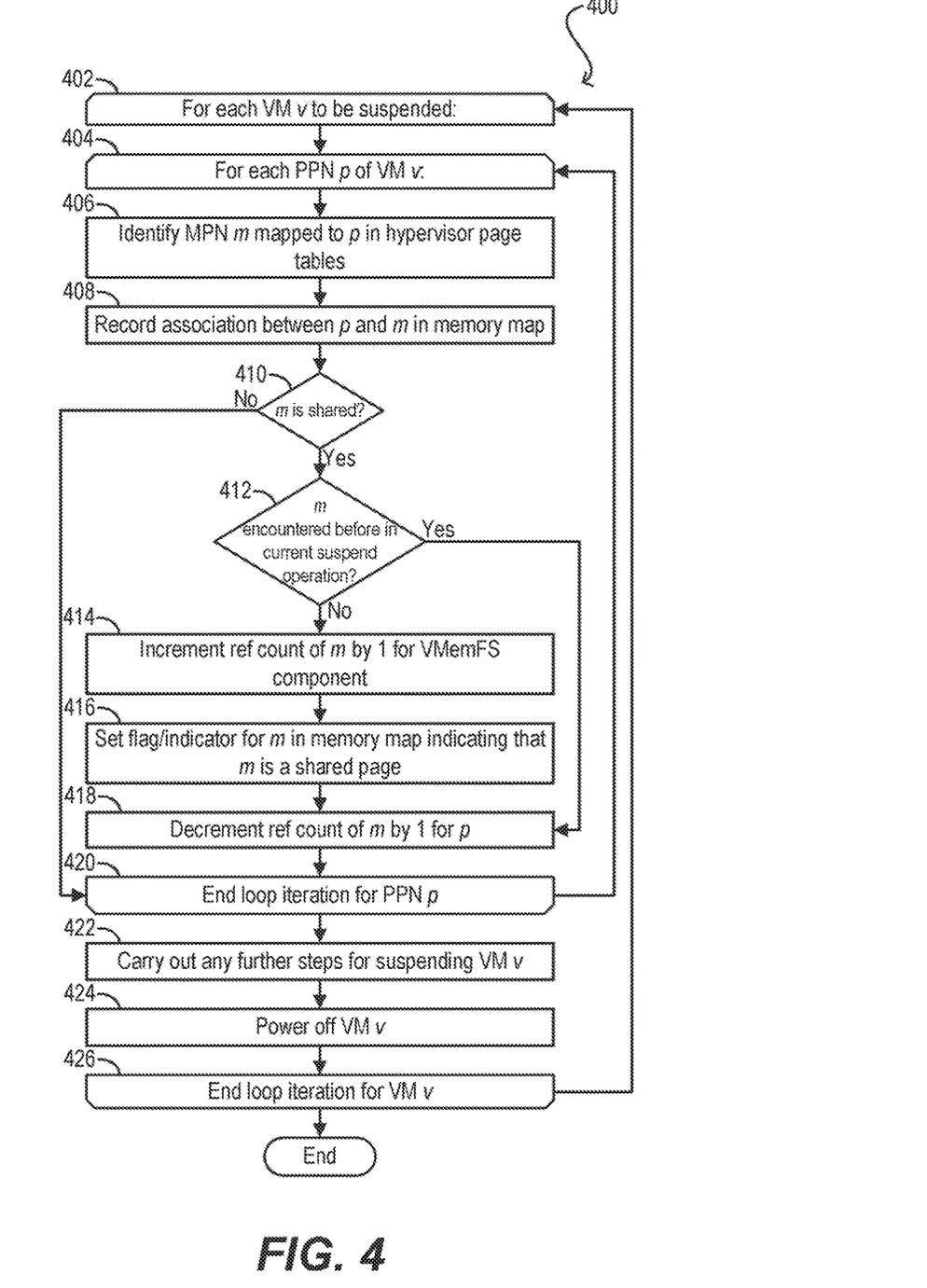
FIGS. 4 and 5 depict workflows for handling shared memory pages across suspend-to-memory and resume-from-memory operations according to certain embodiments.
Figure 5:
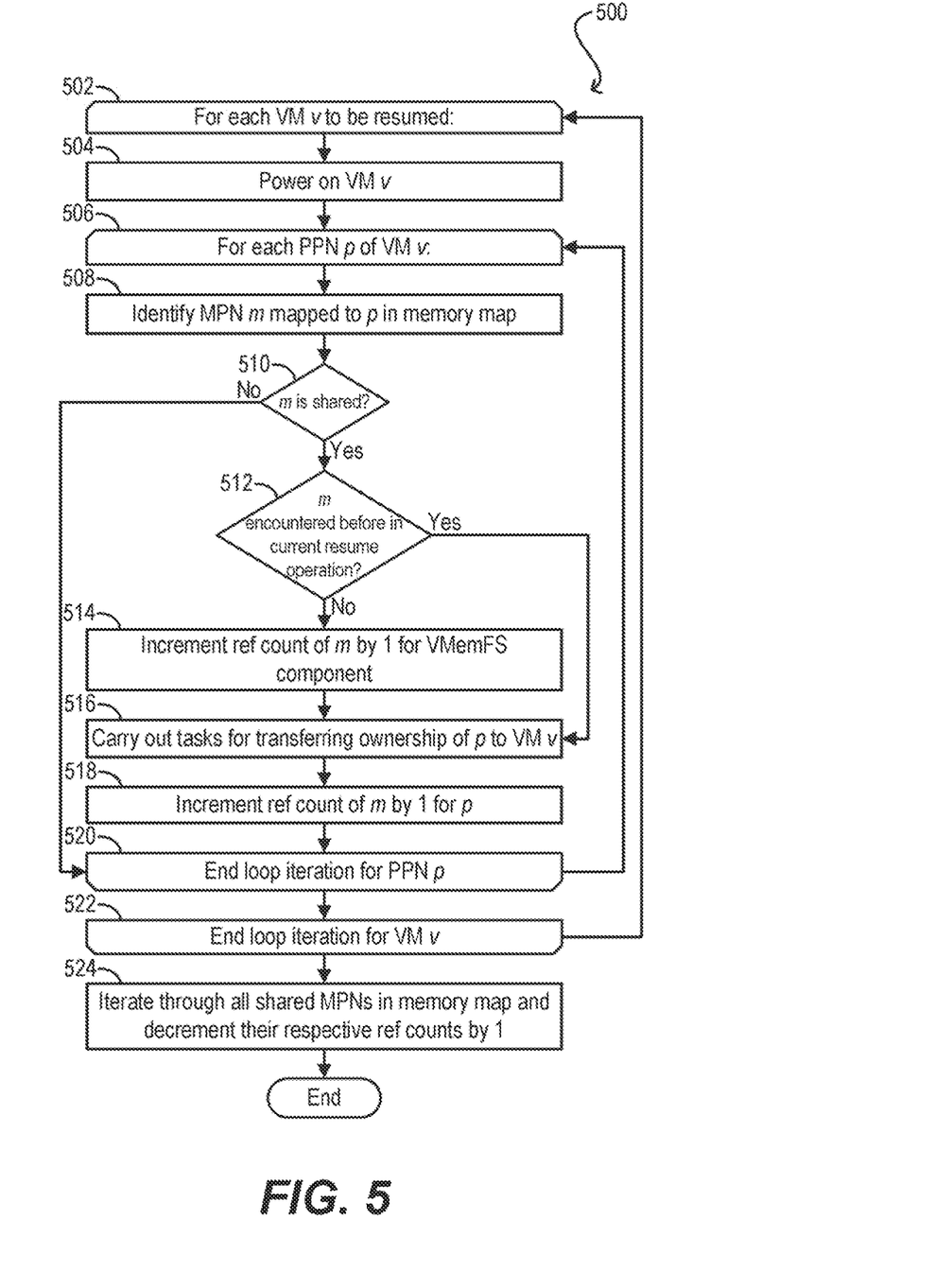

FIGS. 4 and 5 depict workflows 400 and 500 that can be executed by VMemFS component 112 of FIG. 3 (in accordance with page sharing handler 302) for handling shared MPNs across a suspend-to-memory and resume-from-memory operation sequence according to certain embodiments. In particular, workflow 400 can be executed by VMemFS component 112 as part of the suspend-to-memory operation and workflow 500 can be executed by VMemFS component 112 as part of the resume-from-memory operation.

Starting with blocks 402 and 404 of workflow 400, VMemFS component 112 can enter a first loop for each VM v to be suspended and a second loop for each guest physical memory page (i.e., PPN) p of VM v. Within this second loop, VMemFS component 112 can identify a host physical memory page (i.e., MPN) m to which PPN p is mapped (block 406) and record an association between p and m in memory map 114 (thereby transferring ownership of p from VM v to component 112) (block 408).

At block 410, VMemFS component 112 can check whether MPN m is a shared page. Stated another way, VMemFS component 112 can check whether MPN has an entry in hypervisor 106's page sharing hash table with a reference count greater than zero. If the answer at block 410 is yes, VMemFS component 112 can further check whether MPN m has been encountered before in the current suspend-to-memory operation (block 412).

If the answer at block 412 is no, VMemFS component 112 can increment, in the page sharing hash table, the reference count of m by one to account for component 112's handling of the page (block 414). VMemFS component 112 can further set a flag or other indicator in memory map 114 indicating that MPN m is a shared page (block 416).

At block 418, VMemFS component 112 can decrement, in the page sharing hash table, the reference count of MPN m by one (because PPN p, which is currently sharing m, will no longer point to m in hypervisor 106's page tables once VM v is suspended and powered off). VMemFS component 112 can then reach the end of the current PPN loop iteration (block 420) and return to block 404 in order to process the next PPN p of VM v.

Once VMemFS component 112 has processed all of the PPNs of VM v, component 112 can carry out any further steps needed to suspend VM v (block 422), power off the VM (block 424), and reach the end of the current VM loop iteration (block 426). Finally, upon processing all of the VMs to be suspended, VMemFS component 112 can terminate the workflow.

Turning now to workflow 500, VMemFS component 112 can enter a first loop for each VM v to be resumed (block 502), power on the VM (block 504), and enter a second loop for each PPN p of VM v found in memory map 114 (block 506). Within this second loop, VMemFS component 112 can identify an MPN m to which PPN p is mapped (block 508) and check whether m is a shared page, per the memory map (block 510).

If the answer at block 510 is yes, VMemFS component 112 can further check whether MPN m has been encountered before in the current resume-from-memory operation (block 512). If the answer at block 512 is no, VMemFS component 112 can increment, in hypervisor 106's page sharing hash table, the reference count of m by one to account for component 112's handling of the page (block 514).

At block 516, VMemFS component 112 can carry out any tasks needed for transferring ownership of PPN p from component 112 back to VM v. In addition, VMemFS component 112 can increment, in the page sharing hash table, the reference count of MPN m by one to account for the transfer of ownership of PPN p to powered-on VM v (block 518).

At block 520, VMemFS component 112 can reach the end of the current PPN loop iteration and return to block 506 in order to process the next PPN p of VM v. Further, at block 522, VMemFS component 112 can reach the end of the current VM loop iteration and return to block 502 in order to process the next VM v to be resumed.

Finally, upon resuming all VMs, VMemFS component 112 can iterate through all of the shared MPNs in memory map 114 and decrement, in the page sharing hash table, their respective reference counts by one (to undo the extra reference count added at block 514) (block 524). Workflow 500 can subsequently end.

In some scenarios, it may be useful to suspend and resume the VMs of host system 104 to/from volatile memory 110 without quick booting hypervisor 106. For example, this may be desirable for testing purposes. In these scenarios, block 514 of workflow 500 can be omitted because each shared MPN will already have an extra reference count in the page sharing hash table to account for VMemFS component 112, per block 414 of workflow 400.

6. Memory Accounting Workflows

Figure 6:
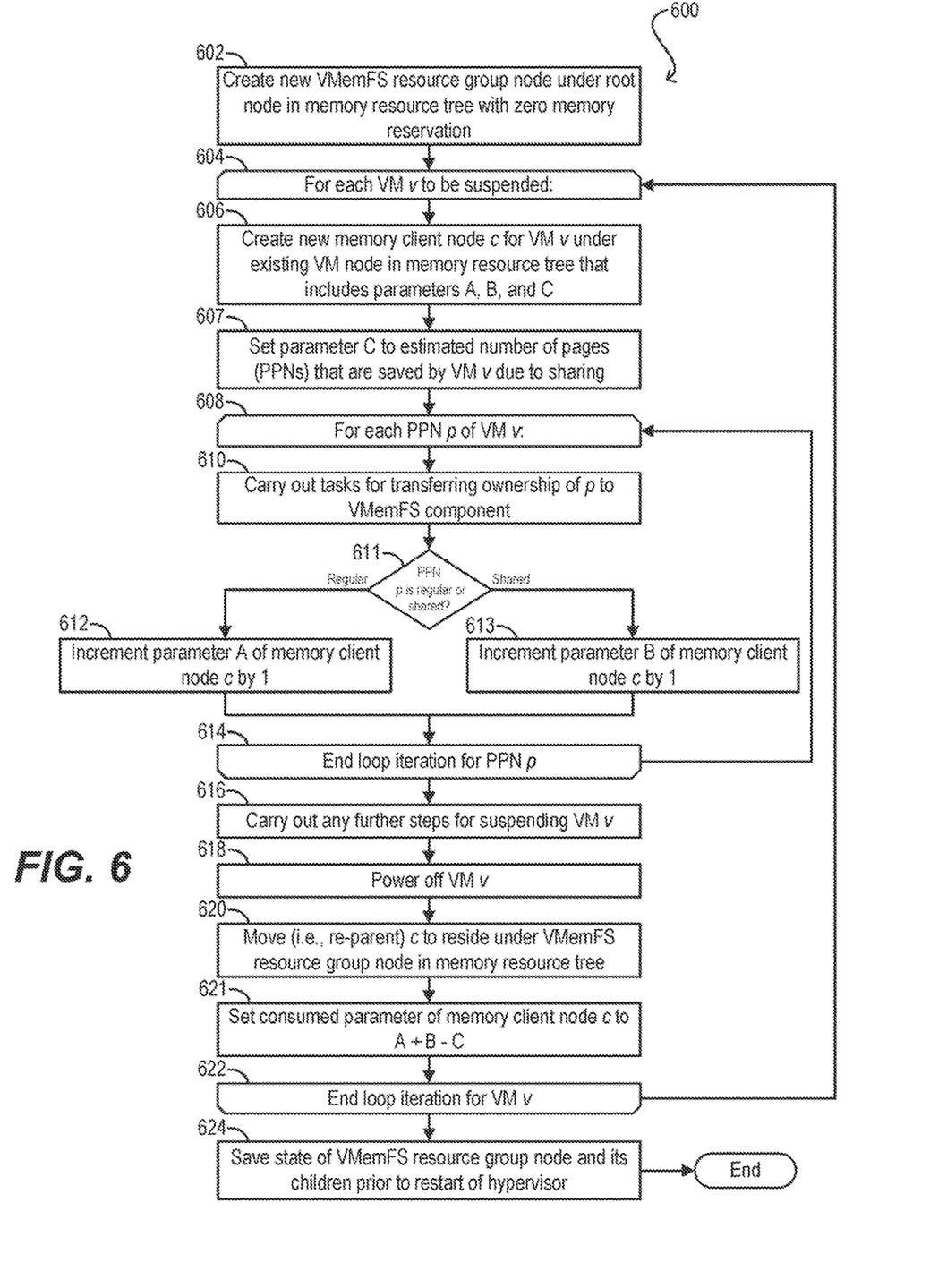
FIGS. 6 and 7 depict workflows for handling memory accounting across suspend-to-memory and resume-from-memory operations according to certain embodiments.
Figure 7:
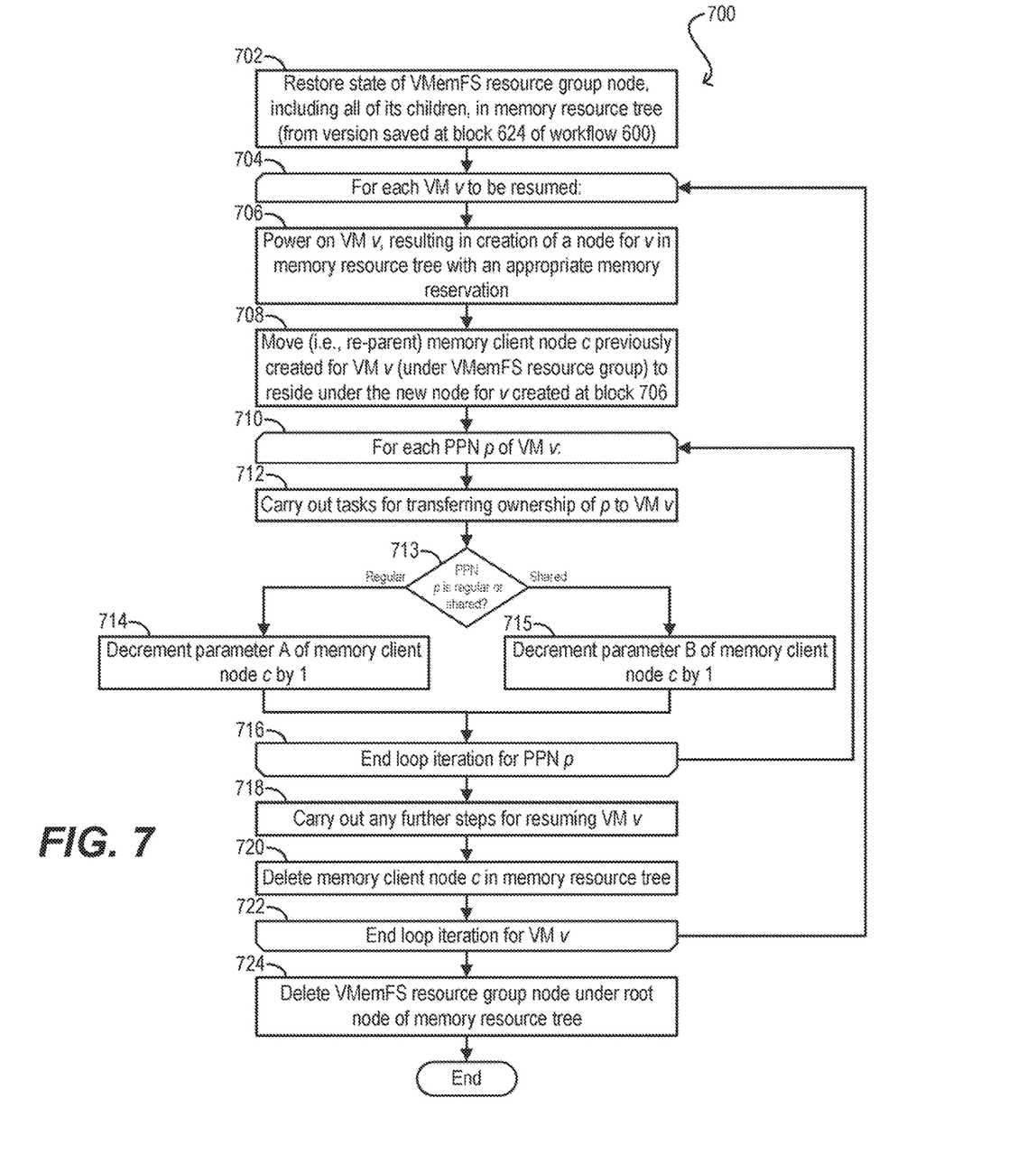

FIGS. 6 and 7 depicts workflows 600 and 700 and that can be executed by VMemFS component 112 of FIG. 3 (in accordance with memory accounting handler 304) for handling memory accounting across a suspend-to-memory and resume-from-memory operation sequence according to certain embodiments. In particular, workflow 600 can be executed by VMemFS component 112 as part of the suspend-to-memory operation and workflow 700 can be executed by VMemFS component 112 as part of the resume-from-memory operation.

Starting with block 602 of workflow 600, VMemFS component 112 can create a new resource group node in hypervisor 106's memory resource tree corresponding to component 112 (referred to as the "VMemFS" resource group node). This resource group node can be attached under the root (i.e., host) node of the tree and can have a memory reservation value of zero.

At blocks 604 and 606, VMemFS component 112 can enter a first loop for each VM v to be suspended and can create a new memory client node for v under v's existing node in the tree. This new memory client node can include, in addition the reservation and consumed parameters, a parameter "A" indicating the number of regular pages of VM v that will be transferred to, and thus consumed by, VMemFS component 112, a parameter "B" indicating the number of shared pages of v that will be transferred to VMemFS component 112), and a parameter "C" indicating an estimated number of pages saved by the page sharing performed by v. At block 607, VMemFS component 112 can populate parameter C with the estimated shared saved page count for v, as obtained from one or more VM data structures. VMemFS component 112 can further enter a second loop for each PPN p of VM v (block 608).

Within this second loop, VMemFS component 112 can carry out any tasks needed for transferring ownership of PPN p from VM v to component 112 (e.g., recording metadata regarding p in memory map 114, etc.) (block 610). VMemFS component 112 can then check whether PPN p is a regular (i.e., non-shared) page or a shared page (block 611). If PPN p is a regular page, VMemFS component 112 can increment parameter A of the new memory client node created at block 606 by one (block 612). Alternatively, if PPN p is a shared page (i.e., points to a shared MPN), VMemFS component 112 can increment parameter B of the new memory client node by one (block 613).

At block 614, VMemFS component 112 can reach the end of the current PPN loop iteration and can return to block 608 in order to process the next PPN p of VM v. Upon processing all of the PPNs of VM v, VMemFS component 112 can carry out any further steps needed to suspend VM v (block 616), power off the VM (block 618), and move (i.e., re-parent) the memory client node created at block 606 to reside under the VMemFS resource group node created at block 602 (block 620). In addition, VMemFS component 112 update the total number of pages consumed by VM v by setting the consumed parameter of the memory client node to A+B−C (block 621).

At block 622, VMemFS component 112 can reach the end of the current VM loop iteration and return to block 604 in order to process the next VM v to be suspended. Finally, at block 624, VMemFS component 112 can save, in memory map 114 or some other location in volatile memory 110, the state of the VMemFS resource group node prior to the restart of hypervisor 106.

Turning now to workflow 700, at blocks 702 and 704, when the system boots up, VMemFS component 112 can restore the state of the VMemFS resource group node, including all of its child memory clients created at block 606 and moved under that group node at block 620, in hypervisor 106's memory resource tree (under the root node). As each child memory client node is restored under the VMemFS resource group node, its consumption can be computed using its parameters A, B, and C via the equation A+B−C. None of these pages use any reservation so the resource group node's reservation value remains 0. Once this is done, a first loop is entered for each VM v to be resumed. Within this first loop, VMemFS component 112 can power on VM v, which results in the creation of a new memory client node for v in the memory resource tree with an appropriate memory reservation (block 706), and move (i.e., re-parent) the memory client node previously created for v at block 606 of workflow 600 and restored at block 702 to reside under the node created at block 706 (block 708).

At block 710, VMemFS component 112 can enter a second loop for each PPN p of VM v found in memory map 114. Within this second loop, VMemFS component 112 can carry out any tasks needed for transferring ownership of PPN p from component 112 back to VM v (block 712). VMemFS component 112 can then check whether PPN p is a regular (i.e., non-shared) page or a shared page (block 713). If PPN p is a regular page, VMemFS component 112 can decrement parameter A of the memory client node moved at block 708 by one (block 714). Alternatively, if PPN p is a shared page (i.e., points to a shared MPN), VMemFS component 112 can decrement parameter B of the new memory client node by one (block 715).

At block 716, VMemFS component 112 can reach the end of the current PPN loop iteration and can return to block 710 in order to process the next PPN p of VM v. Upon processing all of the PPNs of VM v, VMemFS component 112 can carry out any further steps needed to resume VM v (block 718), delete the memory client node under the VM node (block 720), reach the end of the current VM loop iteration (block 722), and return to block 704 in order to process the next VM v to be resumed. Finally, at block 724, VMemFS component 112 can delete the VMemFS resource group node under the root node of hypervisor 106's memory resource tree and workflow 700 can end.

As noted previously with respect to FIGS. 4 and 5, in some scenarios the VMs of host system 104 may be suspended and resumed to/from volatile memory 110 without quick booting hypervisor 106. In these scenarios, blocks 624 and 702 of workflows 600 and 700 can be omitted because the hypervisor's memory resource tree will remain intact across the suspend-to-memory and resume-from-memory operations, and thus there is no need to save and restore the VMemFS resource group node (and its children) via these steps.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising, at a time of suspending a virtual machine (VM) to a volatile memory of a host system:
    creating, by a hypervisor of the host system, a resource group node in a memory resource tree of the hypervisor, the memory resource tree being usable by the hypervisor for tracking volatile memory usage of processes running on the host system;
    creating, by the hypervisor, a memory client node under an existing node for the VM in the memory resource tree;
    for each guest physical memory page of the VM:
        transferring, by the hypervisor, ownership of the guest physical memory page to a component of the hypervisor; and
        incrementing, by the hypervisor, a consumption parameter of the memory client node indicating an amount of the volatile memory consumed by the memory client node; and
    upon completing the suspending of the VM, moving, by the hypervisor, the memory client node to reside under the resource group node in the memory resource tree.

2. The method of claim 1 wherein the resource group node does not reserve any portion of the volatile memory of the host system.

3. The method of claim 1 wherein the resource group node is created under a root node of the memory resource tree, the root node representing a total capacity of the volatile memory of the host system.

4. The method of claim 1 further comprising:
    saving a state of the resource group node to a portion of the volatile memory; and
    subsequently to the saving, restarting the hypervisor without performing a hardware reboot of the host system.

5. The method of claim 1 further comprising, at a time of resuming the VM from the volatile memory:
    powering on the VM, the powering on resulting in creation of a new node for the VM in the memory resource tree; and
    moving the memory client node to reside under the new node for the VM.

6. The method of claim 5 further comprising, at the time of resuming the VM from the volatile memory:
    for each guest physical memory page of the VM:
        transferring ownership of the guest physical memory page to the VM from the component of the hypervisor; and decrementing the consumption parameter of the memory client node.

7. The method of claim 6 further comprising, upon completing the resuming of the VM:
deleting the memory client node and the resource group node from the memory resource tree.

8. A non-transitory computer readable storage medium having stored thereon program code executable by a hypervisor of a host system, the program code embodying a method comprising, at a time of suspending a virtual machine (VM) to a volatile memory of the host system:
creating a resource group node in a memory resource tree of the hypervisor, the memory resource tree being usable by the hypervisor for tracking volatile memory usage of processes running on the host system;
creating a memory client node under an existing node for the VM in the memory resource tree;
for each guest physical memory page of the VM:
transferring ownership of the guest physical memory page to a component of the hypervisor; and
incrementing a consumption parameter of the memory client node indicating an amount of the volatile memory consumed by the memory client node; and
upon completing the suspending of the VM, moving the memory client node to reside under the resource group node in the memory resource tree.

9. The non-transitory computer readable storage medium of claim 8 wherein the resource group node does not reserve any portion of the volatile memory of the host system.

10. The non-transitory computer readable storage medium of claim 8 wherein the resource group node is created under a root node of the memory resource tree, the root node representing a total capacity of the volatile memory of the host system.

11. The non-transitory computer readable storage medium of claim 8 wherein the method further comprises:
saving a state of the resource group node to a portion of the volatile memory; and
subsequently to the saving, restarting the hypervisor without performing a hardware reboot of the host system.

12. The non-transitory computer readable storage medium of claim 8 wherein the method further comprises, at a time of resuming the VM from the volatile memory:
powering on the VM, the powering on resulting in creation of a new node for the VM in the memory resource tree; and
moving the memory client node to reside under the new node for the VM.

13. The non-transitory computer readable storage medium of claim 12 wherein the method further comprises, at the time of resuming the VM from the volatile memory:
for each guest physical memory page of the VM:
transferring ownership of the guest physical memory page to the VM from the component of the hypervisor; and
decrementing the consumption parameter of the memory client node.

14. The non-transitory computer readable storage medium of claim 13 wherein the method further comprises, upon completing the resuming of the VM:
deleting the memory client node and the resource group node from the memory resource tree.

15. A host system comprising:
a hypervisor;
a volatile memory; and
a non-transitory computer readable medium having stored thereon program code that causes the hypervisor to, at a time of suspending a virtual machine (VM) to the volatile memory:
create a resource group node in a memory resource tree of the hypervisor, the memory resource tree being usable by the hypervisor for tracking volatile memory usage of processes running on the host system;
create a memory client node under an existing node for the VM in the memory resource tree;
for each guest physical memory page of the VM:
transfer ownership of the guest physical memory page to a component of the hypervisor; and
increment a consumption parameter of the memory client node indicating an amount of the volatile memory consumed by the memory client node; and
upon completing the suspending of the VM, move the memory client node to reside under the resource group node in the memory resource tree.

16. The host system of claim 15 wherein the resource group node does not reserve any portion of the volatile memory of the host system.

17. The host system of claim 15 wherein the resource group node is created under a root node of the memory resource tree, the root node representing a total capacity of the volatile memory of the host system.

18. The host system of claim 15 wherein the program code further causes the processor to:
save a state of the resource group node to a portion of the volatile memory; and
subsequently to the saving, restart the hypervisor without performing a hardware reboot of the host system.

19. The host system of claim 15 wherein the program code further causes the hypervisor to, at a time of resuming the VM from the volatile memory:
power on the VM, the powering on resulting in creation of a new node for the VM in the memory resource tree; and
move the memory client node to reside under the new node for the VM.

20. The host system of claim 19 wherein the program code further causes the hypervisor to, at the time of resuming the VM from the volatile memory:
for each guest physical memory page of the VM:
transfer ownership of the guest physical memory page to the VM from the component of the hypervisor; and
decrement the consumption parameter of the memory client node.

21. The host system of claim 20 wherein the program code further causes the hypervisor to, upon completing the resuming of the VM:
delete the memory client node and the resource group node from the memory resource tree.

* * * * *